US009550918B2

(12) United States Patent
Lee et al.

(10) Patent No.: US 9,550,918 B2
(45) Date of Patent: Jan. 24, 2017

(54) RADICALLY CURABLE ADHESIVE COMPOSITION AND POLARIZING PLATE INCLUDING THE SAME

(71) Applicant: LG CHEM, LTD., Seoul (KR)

(72) Inventors: Mi-Rin Lee, Daejon (KR); Kwang-Seung Park, Daejon (KR); Jun-Wuk Park, Daejon (KR); Eun-Soo Huh, Daejon (KR)

(73) Assignee: LG Chem, Ltd., Seoul (KR)

( * ) Notice: Subject to any disclaimer, the term of this patent is extended or adjusted under 35 U.S.C. 154(b) by 251 days.

(21) Appl. No.: 14/385,928

(22) PCT Filed: Jun. 16, 2014

(86) PCT No.: PCT/KR2014/005252
§ 371 (c)(1),
(2) Date: Sep. 17, 2014

(87) PCT Pub. No.: WO2015/046714
PCT Pub. Date: Apr. 2, 2015

(65) Prior Publication Data
US 2016/0244640 A1    Aug. 25, 2016

(30) Foreign Application Priority Data

Sep. 30, 2013  (KR) .................. 10-2013-0116997
May 30, 2014   (KR) .................. 10-2014-0066464

(51) Int. Cl.
| | | |
|---|---|---|
| G02B 1/18 | (2015.01) | |
| G02B 5/30 | (2006.01) | |
| C09J 4/00 | (2006.01) | |
| G02B 1/14 | (2015.01) | |

(52) U.S. Cl.
CPC .. *C09J 4/00* (2013.01); *G02B 1/14* (2015.01); *G02B 5/3033* (2013.01)

(58) Field of Classification Search
CPC ......................................... C09J 4/00
See application file for complete search history.

(56) References Cited

U.S. PATENT DOCUMENTS

| | | |
|---|---|---|
| 8,344,083 B2 | 1/2013 | Um et al. |
| 2007/0054131 A1 | 3/2007 | Stewart |
| 2011/0043733 A1 | 2/2011 | Suzuki et al. |
| 2014/0072731 A1* | 3/2014 | Seo .................. C09J 163/00 428/1.53 |
| 2015/0099127 A1 | 4/2015 | Ogawa et al. |

FOREIGN PATENT DOCUMENTS

| | | |
|---|---|---|
| CN | 101296963 A | 10/2008 |
| CN | 101693820 A | 4/2010 |
| CN | 101978295 A | 2/2011 |
| JP | 2000-230016 A | 8/2000 |
| JP | 2001-151814 A | 6/2001 |
| JP | 2002-120326 A | 4/2002 |
| KR | 10-2009-0115040 | 11/2009 |
| KR | 10-2013-0103290 A | 9/2013 |

OTHER PUBLICATIONS

Machine translation of KR 10-2013-0103290.*

* cited by examiner

*Primary Examiner* — Vu A Nguyen
(74) *Attorney, Agent, or Firm* — Dentons US LLP

(57) ABSTRACT

There are provided a radically curable adhesive composition maintaining adhesiveness thereof even in high-humidity environments, and a polarizing plate including the radically curable adhesive composition. The radically curable adhesive composition includes: a compound represented by Formula 1; a vinyl ether-based compound; a carboxylic acid compound having at least one unsaturated double bond; and a radical initiator.

9 Claims, No Drawings

RADICALLY CURABLE ADHESIVE COMPOSITION AND POLARIZING PLATE INCLUDING THE SAME

This application is a 35 USC §371 National Stage entry of International Application No. PCT/KR2014/005252, filed Jun. 16, 2014, and claims the benefit of Korean Application Nos. 10-2013-0116997, filed Sep. 30, 2013, and 10-2014-0066464, filed on May 30, 2014, all of which are hereby incorporated by reference in their entirety for all purposes as if fully set forth herein.

TECHNICAL FIELD

The present disclosure relates to a radically curable adhesive composition and a polarizing plate including the radically curable adhesive composition, and more particularly, to a radically curable adhesive composition having high adhesiveness and heat resistance even in high-humidity environments, and a polarizing plate including the radically curable adhesive composition.

BACKGROUND ART

Recent liquid crystal displays have features such as low power consumption, low operational voltages, light weight, and reduced thicknesses, and thus are used as various display devices. Liquid crystal displays are made up of many elements such as liquid crystal cells, a polarizing plate, a retardation film, a light collecting sheet, a diffusion film, a light guide plate, and a reflection sheet. Therefore, many efforts have been made to achieve objects such as productivity improvements, weight reductions, and brightness improvements by reducing the number or thicknesses of films or sheets.

Current polarizing plates have a stacked structure in which a protective film or protective films are attached to one or both surfaces of a polarizer formed of a polyvinyl alcohol (PVA)-based resin generally dyed with a dichroic dye or iodine, by an adhesive. In the related art, triacetyl cellulose (TAC)-based films have mainly been used as protective films for polarizing plates. However, TAC films are easily deformed in high-temperature, high-humidity environments. Therefore, protective films made of various materials have recently been developed to replace TAC films. For example, methods of using films such as polyethylene terephthalate (PET) films, cycloolefin polymer (COP) films, and acrylic films individually or in combination have been suggested.

Aqueous adhesives usually formed of PVA-based resin solutions have been used as adhesives for attaching protective films to polarizers.

However, if aqueous adhesives are used for protective films other than TAC films, such as acrylic films or COP films, the adhesiveness of the aqueous adhesives becomes poor. Therefore, the use of aqueous adhesives is limited to kinds of film materials. In addition to the poor adhesiveness of aqueous adhesives to some materials, if protective films formed of different materials are attached to both surfaces of a polarizer by using an aqueous adhesive, curling may appear on a polarizing plate after a drying process of the aqueous adhesive, and initial optical properties of the polarizing plate may be worsened. Furthermore, since aqueous adhesives inevitably require a drying process, the defect rate may be increased because of differences in water permeability and thermal expansion rates during the drying process. To address these problems, methods of using nonaqueous adhesives instead of aqueous adhesives have been proposed.

Nonaqueous adhesives that have been proposed as adhesives for polarizing plates may be classified into a radically curable type and a cationically curable type according to curing methods. Although cationically curable adhesives have high degrees of adhesiveness with respect to various films, the curing rate and curing degree thereof are low, and thus it is disadvantageous to use cationically curable adhesives in a manufacturing process. To overcome theses demerits of cationically curable adhesives, radically curable adhesives including an acrylamide-based compound as a main ingredient have been proposed. Radically curable adhesives including an acrylamide-based compound as main an ingredient can be cured more rapidly than cationically curable adhesives. However, the curing rate and adhesiveness of radically curable adhesives having an acrylamide-based compound as a main ingredient are lowered in high-humidity environments. In addition, since polarizing plate manufacturing processes include a wet process in which PVA films are swelled, dyed, and stretched in an aqueous solution, polarizers contain a large amount of moisture, and thus an additional pretreatment preprocess for drying polarizers with hot air or treating surfaces of polarizers with plasma is necessary for manufacturing polarizing plates using such acrylamide-based radically curable adhesive composition adhesives.

Therefore, there is a need for a radically curable adhesive maintaining a curing rate and adhesiveness thereof, even in high-humidity environments and thus which is applicable to polarizing plates without having to perform an additional process.

DISCLOSURE

Technical Problem

Aspects of the present disclosure may provide a radically curable adhesive composition maintaining a curing rate and adhesiveness thereof, even in high-humidity environments, and a polarizing plate including the radically curable adhesive composition.

Technical Solution

According to an aspect of the present disclosure, a radically curable adhesive composition may include: a compound represented by the following Formula 1; a vinyl ether-based compound; a carboxylic acid compound having at least one unsaturated double bond; and a radical initiator,

[Formula 1]

where $R_1$ is an ester group or an ether group, $R_2$ is a $C_{1-10}$ alkyl group including at least one hydroxy substituent or a $C_{4-10}$ cycloalkyl group including at least one hydroxy substituent, and $R_3$ is hydrogen or a $C_{1-10}$ alkyl group.

In this case, the radically curable adhesive composition may include, based on 100 parts by weight thereof, 40 to 90 parts by weight of the compound represented by Formula 1; 1 to 50 parts by weight of the vinyl ether-based compound;

1 to 50 parts by weight of the carboxylic acid compound having at least one unsaturated double bond; and 0.5 to 10 parts by weight of the radical initiator.

The compound represented by Formula 1 may include at least one selected from the group consisting of compounds represented by the following Formulas 2 to 9:

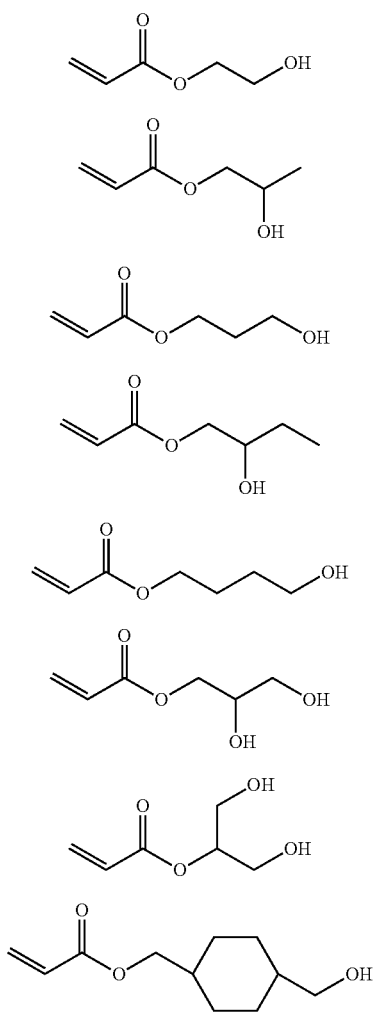

The vinyl ether-based compound may include at least one selected from the group consisting of ethylene glycol monovinyl ether, 1,4-butanol vinyl ether, di(ethylene glycol) divinyl ether, tri(ethylene glycol) divinyl ether, tert-butyl vinyl ether, 1-(vinyloxy)-2,2-bis((vinyloxy)methyl)butane, 1,3-bis(vinyloxy)-2,2-bis((vinyloxy)methyl)propane, and cyclohexyl vinyl ether. The carboxylic acid compound having at least one unsaturated double bond may include at least one selected from the group consisting of maleic acid, fumaric acid, angelic acid, and tiglic acid.

If necessary, the radically curable adhesive composition may further include a compound having an acidity of 100 to 1,000 mg KOH/g. In this case, the compound having an acidity of 100 to 1,000 mg KOH/g may be included in an amount of about 10 parts by weight to about 50 parts by weight, based on 100 parts by weight of the radically curable adhesive composition.

In addition, if necessary, the radically curable adhesive composition may further include a photoacid generator. The photoacid generator may be included in an amount of about 0.5 parts by weight to about 10 parts by weight, based on 100 parts by weight of the radically curable adhesive composition.

The radically curable adhesive composition may have a glass transition temperature of 60° C. or higher.

According to another aspect of the present disclosure, a polarizing plate may include: a polarizer; an adhesive layer formed on at least one surface of the polarizer; and a protective film formed on the adhesive layer, wherein the adhesive layer may be formed of the radically curable adhesive composition.

Advantageous Effects

The radically curable adhesive composition of the present disclosure maintains adhesiveness thereof even in high-humidity environments, and thus may be usefully used between a polarizer and a protective film that contain a large amount of moisture. In addition, the polarizing plate including the radically curable adhesive composition may have high durability even in high-humidity, high-temperature environments.

BEST MODE

Embodiments of the present disclosure will now be described in detail. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

The inventors have repeatedly conducted research into developing a radically curable adhesive composition stably maintaining adhesiveness thereof even in high-humidity environments. As a result, the inventors have found that if a vinyl ether-based compound and a carboxylic acid compound are mixed with a compound including a hydroxy group, a composition maintaining adhesiveness thereof even in high-humidity environments can be prepared. Based on this knowledge, the inventors have invented the present invention.

In detail, a radically curable adhesive composition of the present disclosure includes a compound represented by the following Formula 1, a vinyl ether-based compound, a carboxylic acid compound having at least one unsaturated double bond, and a radical initiator.

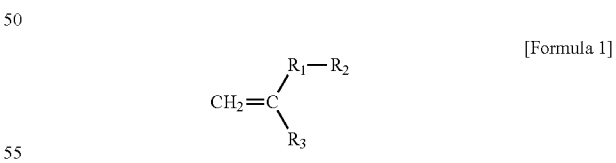

[Formula 1]

In Formula 1, $R_1$ is an ester group or an ether group, $R_2$ is a $C_{1-10}$ alkyl group or $C_{4-10}$ cycloalkyl group including at least one hydroxy substituent, and $R_3$ is hydrogen or a $C_{1-10}$ alkyl group. In $R_2$, the alkyl group may be linear or branched alkyl, and the hydroxy substituent may be located at an arbitrary position of the alkyl group or the cycloalkyl group. For example, the hydroxy substituent may be located on an end of the alkyl group or in an arbitrary position of the alkyl group.

Preferably, the radically curable adhesive composition may include, based on 100 parts by weight thereof, 40 to 90 parts by weight of the compound represented by Formula 1; 1 to 50 parts by weight of the vinyl ether-based compound; 1 to 50 parts by weight of the carboxylic acid compound having at least one unsaturated double bond; and 0.5 to 10 parts by weight of the radical initiator.

The compound represented by Formula 1 functions as an adhesive ingredient, and various compounds represented by Formula 1 may be used as the compound. In the present disclosure, for example, the first compound may include at least one selected from the group consisting of compounds represented by the following Formulas 2 to 9. However, the compound represented by Formula 1 is not limited thereto.

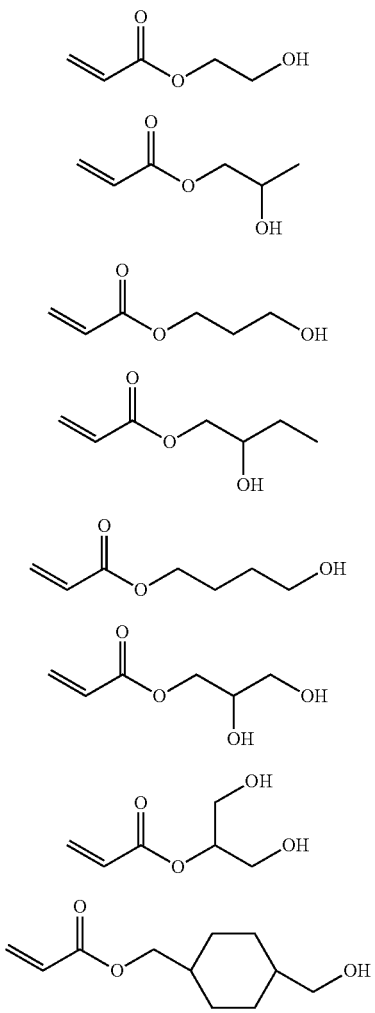

The content of the compound represented by Formula 1 may range from about 40 parts by weight to about 90 parts by weight, preferably from about 50 parts by weight to about 80 parts by weight, more preferably from about 60 parts by weight to about 80 parts by weight, based on 100 parts by weight of the radically curable adhesive composition. If the content of the compound represented by Formula 1 is less than 40 parts by weight, it may be difficult to obtain sufficient adhesiveness, and if the content of the compound represented by Formula 1 is greater than 80 parts by weight, the glass transition temperature of the radically curable adhesive composition may be lowered to cause a decrease in heat resistance.

The vinyl ether-based compound forms a composite, together with the carboxylic acid compound (to be described later), through a copolymer reaction when the radically curable adhesive composition is cured, thereby imparting humidity resistance to the radically curable adhesive composition. For example, the vinyl ether-based compound may include at least one selected from the group consisting of ethylene glycol monovinyl ether, 1,4-butanol vinyl ether, di(ethylene glycol) divinyl ether, tri(ethylene glycol) divinyl ether, tert-butyl vinyl ether, 1-(vinyloxy)-2,2-bis((vinyloxy)methyl)butane, 1,3-bis(vinyloxy)-2,2-bis((vinyloxy)methyl)propane, and cyclohexyl vinyl ether. However, the vinyl ether-based compound is not limited thereto.

The content of the vinyl ether-based compound may range from about 1 part by weight to about 50 parts by weight, preferably from about 1 part by weight to about 40 parts by weight, more preferably from about 1 part by weight to about 30 parts by weight, based on 100 parts by weight of the radically curable adhesive composition. If the content of the vinyl ether-based compound is within the above range, the adhesiveness of the radically curable adhesive composition may be maintained at a high level, even in high-humidity environments.

The carboxylic acid compound having at least one unsaturated double bond forms a composite together with the vinyl ether-based compound through a copolymer reaction when the radically curable adhesive composition is cured, thereby imparting humidity resistance to the radically curable adhesive composition. For example, the carboxylic acid compound may include at least one selected from the group consisting of maleic acid, fumaric acid, angelic acid, and tiglic acid. However, the carboxylic acid compound is not limited thereto.

The content of the carboxylic acid compound may range from about 1 part by weight to about 50 parts by weight, preferably from about 1 part by weight to about 40 parts by weight, more preferably from about 1 part by weight to about 30 parts by weight, based on 100 parts by weight of the radically curable adhesive composition. If the content of the carboxylic acid compound is within the above range, the adhesiveness of the radically curable adhesive composition may be maintained at a high level even in high-humidity environments.

In the case of radically curable adhesive compositions of the related art, a radically curable adhesive composition is bonded to a polyvinyl alcohol-based film as a result of hydrogen bonds between hydroxy groups contained in the radically curable adhesive composition and hydroxy groups existing on the surface of the polyvinyl alcohol-based film. In high-humidity environments, however, the hydroxy groups existing on the surface of the polyvinyl alcohol-based film may be hydrogen-bonded to moisture instead of to the radically curable adhesive composition, and thus the adhesiveness of the radically curable adhesive composition is lowered. In the case of the radically curable adhesive composition of the present disclosure, however, the vinyl ether-based compound forms a composite together with the carboxylic acid compound through a copolymer reaction when the radically curable adhesive composition is cured, and a carboxylic acid contained in the composite is first coupled to moisture in high-humidity environments. Therefore, hydrogen bonds between hydroxyl groups of a polyvinyl alcohol-based film and the radically curable adhesive composition may be maintained to prevent deterioration of the adhesiveness of the radically curable adhesive composition.

In the present disclosure, the radical initiator is included in the radically curable adhesive composition to facilitate radical polymerization and thus to increase the rate of curing. The radical initiator may be any material generally used as a radical initiator in the related art. For example, the radical initiator may include at least one selected from the group consisting of 1-Hydroxy-cyclohexyl-phenyl-ketone, 2-hydroxy-2-methyl-1-phenyl-1-propanone, 2-Hydroxy-1-[4-(2-hydroxyethoxy) phenyl]-2-methyl-1-propanone, methylbenzoylformate, oxy-phenyl-acetic acid-2-[2 oxo-2phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-Benzyl-2-(dimethylamino)-1-[4-(4-morpholinyl) phenyl]-1-butanone, 2-methyl-1-[4-(methylthio)phenyl]-2-(4-morpholinyl)-1-propanone, diphenyl (2,4,6-trimethylbenzoyl)-phosphine oxide, and phenyl bis (2,4,6-trimethyl benzoyl) phosphine oxide. In the present disclosure, particularly, the radical initiator may be phenyl bis (2,4,6-trimethyl benzoyl) phosphine oxide.

Preferably, the content of the radical initiator may range from about 0.5 parts by weight to about 10 parts by weight, from about 1 part by weight to about 5 parts by weight, or from about 2 parts by weight to about 3 parts by weight, based on 100 parts by weight of the radically curable adhesive composition. If the content of the radical initiator is within the above range, the radically curable adhesive composition may be easily cured.

If necessary, the radically curable adhesive composition of the present disclosure may further include a compound having an acidity of 100 to 1,000 mg KOH/g. For example, the acidity of the compound may range from about 100 to about 300 mg KOH/g or from about 300 to about 900 mg KOH/g. If the radically curable adhesive composition further includes the compound having a high acidity, the glass transition temperature of the radically curable adhesive composition may be increased without lowering the adhesive thereof, and thus the heat resistance of the radically curable adhesive composition may be improved. Herein, the acidity refers to the amount of KOH in milligrams (mg) necessary to fully neutralize 1 g of a sample.

The compound having an acidity of 100 to 1,000 mg KOH/g may be any compound that can be commonly used together with the radically curable adhesive composition of the present disclosure and has an acidity within the above range. For example, the compound having an acidity of 100 to 1,000 mg KOH/g may include at least one selected from the group consisting of compounds represented by the following Formulas 10 to 21:

[Formula 10]

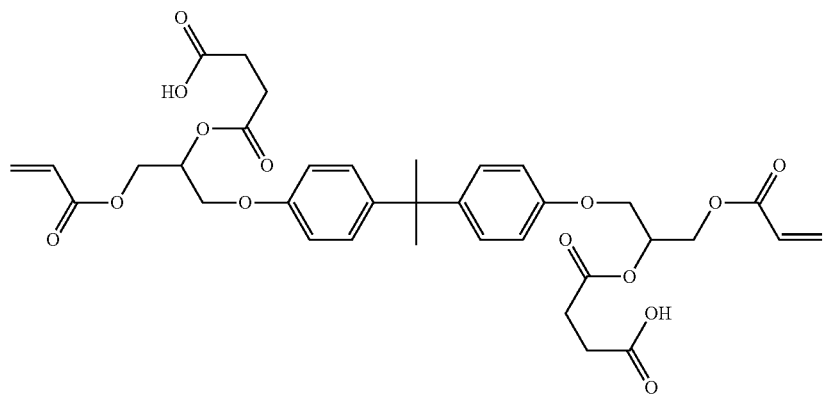

[Formula 11]

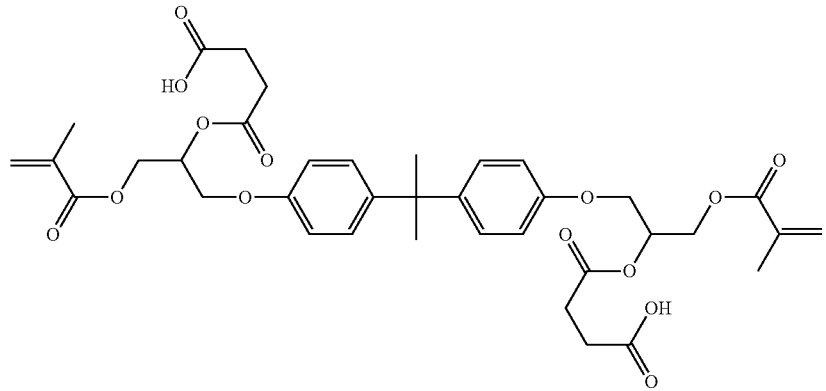

[Formula 12]

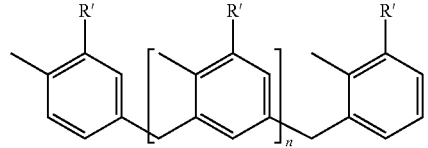

where R' is

9
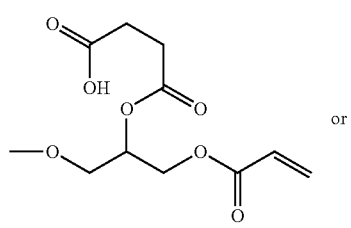
or
10
-continued
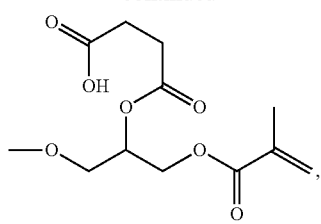
and n is an integer ranging from 1 to 5
[Formula 13]
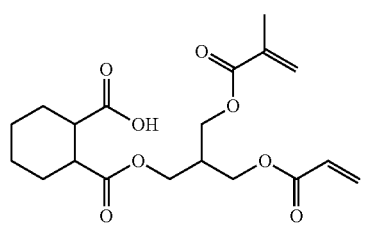
[Formula 14]
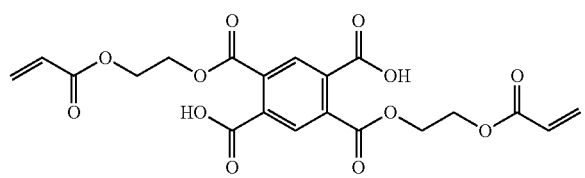
[Formula 15]
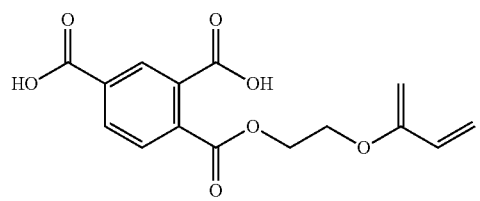
[Formula 16]
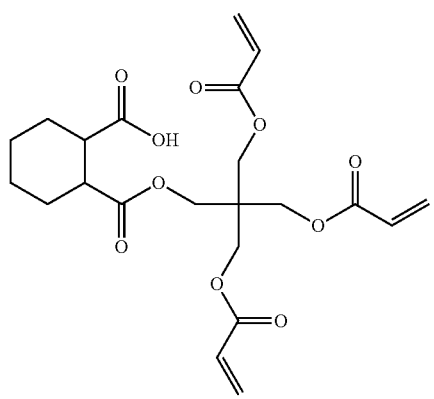
[Formula 17]
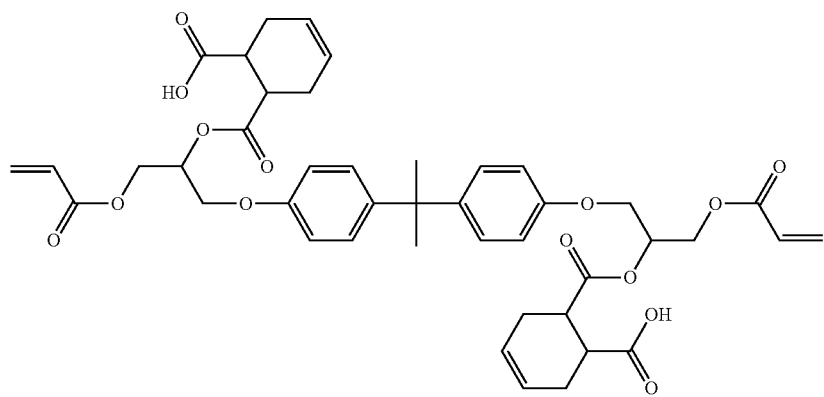
[Formula 18]
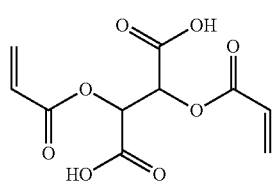
[Formula 19]
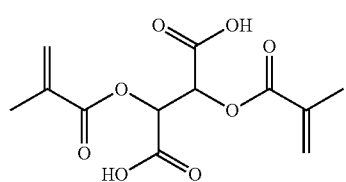

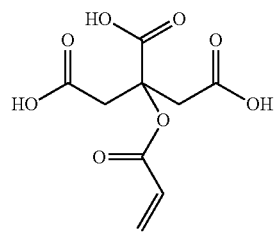

[Formula 20]

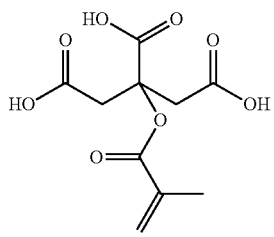

[Formula 21]

The content of the compound having an acidity of 100 to 1,000 mg KOH/g may range from about 10 parts by weight to about 50 parts by weight or from about 10 parts by weight to 30 parts by weight, based on 100 parts by weight of the radically curable adhesive composition. If the content of the compound having an acidity of 100 to 1,0000 mg KOH/g is within the above-mentioned range, the radically curable adhesive composition may have high adhesiveness to a polarizer and high heat resistance.

In addition, if necessary, the radically curable adhesive composition of the present disclosure may further include a photoacid generator. The photoacid generator is a compound generating acid ($H^+$) when exposed to active energy rays. If the radically curable adhesive composition further includes the photoacid generator, the acidity of the radically curable adhesive composition may be controlled using the photoacid generator, and thereby, the adhesiveness of the radically curable adhesive composition may be further improved.

In the present disclosure, for example, the photoacid generator may include a sulfonium salt or an iodonium salt. For example, specifically, the photoacid generator including the sulfonium salt or the iodonium salt may include at least one selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl) phenyl]-Iodonium hexafluorophosphate, (Thiodi-4,1-phenylene)bis(diphenyl-sulfonium) dihexafluoroantimonate, and (Thiodi-4,1-phenylene)bis(diphenylsulfonium)dihexafluorophosphate. However, the photoacid generator is not limited thereto.

The content of the photoacid generator may be 10 parts by weight or less based on 100 parts by weight of the radically curable adhesive composition. Preferably, the content of the photoacid generator may range from 0.5 parts by weight to 10 parts by weight, from 1 part by weight to 6 parts by weight, or 3 parts by weight to 5 parts by weight, based on 100 parts by weight of the radically curable adhesive composition. In the present disclosure, if the content of the photoacid generator in the radically curable adhesive composition is within the above-mentioned range, the adhesiveness of the radically curable adhesive composition may be improved as compared with the case in which the radically curable adhesive composition does not include the photoacid generator or the content of the photoacid generator is outside the above range.

In the present disclosure, for example, it may be preferable that the acidity of the radically curable adhesive composition range from about 60 to about 300 mg KOH/g, from about 80 to about 200 mg KOH/g, or from about 100 to about 150 mg KOH/g. In the present disclosure, if the acidity of the radically curable adhesive composition is within the above range, the glass transition temperature (Tg) of the radically curable adhesive composition may be improved while maintaining the adhesiveness of the radically curable adhesive composition, and thus a polarizing plate having high heat resistance may be manufactured using the radically curable adhesive composition.

Preferably, the radically curable adhesive composition of the present disclosure may have a glass transition temperature within the range of about 60° C. to about 500° C. after being cured. For example, the radically curable adhesive composition may have a glass transition temperature within the range of 60° C. to 300° C., 80° C. to 300° C., or 90° C. to 200° C. In the present disclosure, if a polarizing plate is manufactured using the radically curable adhesive composition having a glass transition temperature within the above-mentioned range, the polarizing plate may have high heat resistance and water resistance.

In addition, preferably, the radically curable adhesive composition of the present disclosure may have a viscosity within the range of about 10 cP to about 300 cP or about 20 cP to about 100 cP. If the radically curable adhesive composition has viscosity within the above range, a thin adhesive layer may be formed of the radically curable adhesive composition, and processability may be improved owing to low viscosity.

In addition, the adhesive layer formed of the radically curable adhesive composition may have a thickness of 0.1 µm to 20 µm or 0.5 µm to 5 µm. If the thickness of the adhesive layer is within the above range, a polarizing plate having high heat resistance may be manufactured using the radically curable adhesive composition.

The above-described radically curable adhesive composition of the present disclosure may have high adhesiveness with respect to various films and maintain it adhesiveness even in high-humidity environments. Therefore, the radically curable adhesive composition may be usefully used in polarizing plates. Furthermore, since the radically curable adhesive composition of the present disclosure has a high curing rate and a high curing degree, the productivity of a polarizing plate manufacturing process may be improved.

Next, a polarizing plate of the present disclosure will be described in detail.

The polarizing plate of the present disclosure includes: a polarizer; a radically cured adhesive layer formed on at least one surface of the polarizer; and a protective film formed on the adhesive layer, wherein the adhesive layer is formed of the above-described radically curable adhesive composition.

The polarizer is not limited to a particular type. A polarizer well known in the related art, such as a polyvinyl alcohol (PVA) film including an iodine or dichroic die, may be used as the polarizer. The polarizer may be formed by dyeing a PVA film with an iodine or dichroic die. However, the polarizer is not limited thereto. In the present disclosure, the term "polarizer" refers to a polarizer not including a protective film, and the term "polarizing plate" refers to a polarizing plate including a polarizer and a protective film.

The radically cured adhesive layer is formed of the above-described radically curable adhesive composition of the present disclosure, and a method known in the related art may be used to form the radically cured adhesive layer. For example, the adhesive layer may be formed by applying the radically curable adhesive composition to one surface of the protective film, bringing the polarizer and the protective film into contact with each other, and curing the radically curable adhesive composition with active energy rays.

The protective film supports and protects the polarizer and may be formed of a material generally known in the related art. Non-limiting examples of the protective film include cellulose-based films, polyethylene terephthalate (PET) films, cycloolefin polymer films, and acrylic films. An acrylic film may be used as the protective film in terms of optical characteristics, durability, and economic factors.

An acrylic film means a film including a (meth)acrylate-based resin and may be obtained, for example, by extruding a film formation material including a (meth)acrylate-based resin as a main ingredient.

In detail, the acrylic film may include a copolymer having an alkyl(meth)acrylate unit and a styrene unit, and an aromatic resin having a carbonate moiety in the main chain. Alternatively, the acrylic film may include an alkyl(meth)acrylate unit, a styrene unit, a 3- to 6-membered heterocyclic unit substituted with at least one carbonyl group, and a vinyl cyanide unit.

Alternatively, the acrylic film may include a (meth)acrylate-based resin having an aromatic ring. As an example of the (meth)acrylate-based resin having an aromatic ring, a resin composition is disclosed in Korean Patent Application Laid-open Publication No.: 10-2009-0115040. The disclosed resin composition includes: (a) a (meth)acrylate unit including at least one (meth)acrylate derivative; (b) an aromatic unit including a chain having a hydroxyl-containing moiety and an aromatic moiety; and (c) a styrene unit including at least one styrene derivative. The units (a) to (c) may be included in the resin composition as separate copolymers, or two or more of the units (a) to (c) may be included in the resin composition as a copolymer.

Alternatively, the acrylic film may include an acrylic resin having a lactone ring structure. Examples of a (meth)acrylate-based resin having a lactone ring structure are disclosed in Japanese Patent Application Laid-open Publication Nos. 2000-230016, 2001-151814, and 2002-120326.

The acrylic film may be formed by any method. For example, materials such as a (meth)acrylate resin, a polymer, and an additive may be fully mixed by an appropriate method to form a thermoplastic resin composition, and a film may be formed of the thermoplastic resin composition. In another example, solutions such as a (meth)acrylate resin solution, a polymer solution, and an additive solution may be individually prepared and mixed with each other to obtain a uniform solution mixture, and a film may be formed using the uniform solution mixture.

The thermoplastic resin composition may be obtained by: pre-blending the above-described raw materials using an appropriate mixer such as an omni-mixer; and kneading and extruding the mixture. The mixture may be kneaded and extruded by any mixer. For example, an extruder such as a uniaxial extruder or a biaxial extruder, or a pressure kneader may be used.

In the above, an appropriate film forming method such as a solution casting method, a melting extrusion method, a calendaring method, or a compressing method may be used. For example, the solution casting method or the melting extrusion method may be used.

Examples of a solvent that may be used in the solution casting method include: aromatic hydrocarbons such as benzene, toluene, and xylene; aliphatic hydrocarbons such as cyclohexane and decalin; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethylformamide; and dimethyl sulfoxide. The listed solvents may used individually or in combination.

The solution casting method may be performed by using a device such as a drum casting machine, a band casting machine, or a spin coater. Examples of the melting extrusion method may include a T-die method and an inflation method. Such a film formation method may preferably be performed at 150° C. to 350° C., more preferably at 200° C. to 300° C.

In the case of forming a film using the T-die method, a T-die may be disposed on a leading end of a well-known uniaxial or biaxial extruder, and an extruded film may be rolled into a roll. In this case, the temperature of a roll may be properly controlled so that the film may be stretched (oriented) in an extrusion direction (uniaxial stretching). In addition, simultaneous or sequential orientation may be performed by simultaneously or sequentially orienting the film in a direction perpendicular to the extrusion direction.

The acrylic film may be a non-oriented film or an oriented film. In the latter case, the acrylic film may be a uniaxially oriented film or a biaxially oriented film. If the acrylic film is a biaxially oriented film, the acrylic film may a simultaneously biaxially oriented film or a sequentially biaxially oriented film. If the acrylic film is a biaxially oriented film, the quality of the acrylic film may be improved owing to improved mechanical strength. If the acrylic film includes a thermoplastic resin, although the acrylic film is oriented, the phase difference of the acrylic film may not be increased, and the optical isotropy of the acrylic film may be maintained.

The acrylic film may be oriented at a temperature around the glass transition temperature of the thermoplastic resin composition, preferably at a temperature of (glass transition temperature−30° C.) to (glass transition temperature+100° C.), more preferably at a temperature of (glass transition temperature−20° C.) to (glass transition temperature+80° C.). If the orientation temperature is lower than (glass transition temperature−30° C.), a sufficient orientation ratio may not be obtained. On the other hand, if the orientation temperature is higher than (glass transition temperature+100° C.), the thermoplastic resin composition may flow, and thus orientation may not be stably performed.

An area orientation ratio of the acrylic film may preferably be within the range of 1.1 to 25, more preferably within 1.3 to 10. If the area orientation ratio is lower than 1.1, although the acrylic film is oriented, the toughness of the acrylic film may not be improved. If the area orientation ratio is higher than 25, orientation effects may not be further obtained.

An orientation rate may preferably be within 10%/min to 20,000%/min, more preferably within 100%/min to 10,000%/min. If the orientation rate is lower than 10%/min, it may take a long period of time to obtain a sufficient orientation ratio, and thus manufacturing costs may be increased. If the orientation rate is higher than 20,000%/min, the acrylic film may be fractured during orientation.

After the acrylic film is oriented, the acrylic film may be heat-treated (annealed) for stabilizing optical isotropic and mechanical characteristics thereof. Conditions for the heat treatment are not limited. For example, the heat treatment may be performed in proper conditions known in the related art.

In addition, the acrylic film may be surface-treated for improving adhesiveness. For example, at least one selected from the group consisting of alkali treatments, corona treatments, and plasma treatments may be performed on at least one surface of the optical film.

The polarizing plate of the present disclosure may be usefully used in an optical device such as a liquid crystal display. For example, the optical device may be a liquid crystal display including an liquid crystal panel and polarizing plates disposed on both surfaces of the liquid crystal panel, and at least one of the polarizing plates may be the polarizing plate of the present disclosure. In this case, the liquid crystal panel is not limited to a particular type thereof. Examples of the liquid crystal panel include: passive matrix panels such as twisted nematic (TN) panels, super twisted nematic (STN) panels, ferroelectric (F) panels, or polymer dispersed (PD) panels; active matrix panels such as two terminal panels or three terminal panels; in-plane switching (IPS) panels; and vertical alignment (VA) panels. However, the liquid crystal panel is not limited to such well-known panels. In addition, other structures of the liquid crystal display, such as upper and lower substrates (e.g., color filter substrates or array substrates), are not limited. For example, the other structures of the liquid crystal panel may be structures well known in the related art.

MODE FOR INVENTION

Hereinafter, examples of the present disclosure will be described.

Manufacturing Example 1

Acrylic Protective Film Manufacturing

A resin composition prepared by uniformly mixing poly (N-cyclohexyl maleimide-co-methyl methacrylate), a copolymer of styrene-maleic anhydride, and a phenoxy resin at a weight ratio of 100:2.5:5 was supplied to a 24φ extruder in a state in which a region from a raw-material hopper to the 24φ extruder was filled with nitrogen so as to melt the resin composition and extrude the resin composition as pellets.

The phenoxy resin was PKFE (Mw=60,000, Mn=16,000, Tg=95° C.) by InChemRez®, the copolymer of styrene-maleic anhydride was Dylaeck 332 including 85 wt % styrene and 15 wt % maleic anhydride, and the poly(N-cyclohexyl maleimide-co-methyl methacrylate) was measured by NMR analysis as including 6.5 wt % N-cyclohexyl maleimide.

After the pellets obtained as described above was dried in a vacuum, the pellets was melted using an extruder at 260° C. and passed through a coat hanger type T-die, chromium-coated casting rolls, and drying rolls, so as to form a 150-μm film. The film was stretched (oriented) at 125° C. to a stretching percentage of 170% in an MD direction by using a roll speed difference in a stretching machine. As a result, an acrylic film was manufactured.

The acrylic film manufactured as described above was treated with corona. Thereafter, a primer composition prepared by adding 20 parts by weight of an oxazoline cross-linking agent (by Niho Catalyst) to a composition having a solid content of 10 wt % prepared by diluting CK-PUD-F (Chokwang urethane dispersion) with pure water was coated on one surface of the acrylic film using bar #7. Then, the acrylic film was stretched (oriented) at 130° C. to a stretching percentage of 190% in a TD direction by using a tenter. As a result, an acrylic protective film having a primer layer thickness of 400 nm was manufactured.

Manufacturing Example 2

Adhesive Composition A

Adhesive composition A was prepared by: putting together 4.3 parts by weight of ethylene glycol monovinyl ether, 5.7 parts by weight of maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) together with 100 parts by weight of the resins.

Manufacturing Example 3

Adhesive Composition B

Adhesive composition B was prepared by: putting together 4.3 parts by weight of ethylene glycol monovinyl ether, 5.7 parts by weight of maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) and 5 parts by weight of diphenyl (4-phenylthio)phenylsulfonium hexafluorophosphate (photoacid generator) together with 100 parts by weight of the resins.

Manufacturing Example 4

Adhesive Composition C

Adhesive composition C was prepared by: putting together 4.3 parts by weight of ethylene glycol monovinyl ether, 5.7 parts by weight of maleic acid, 60 parts by weight of 4-hydroxybutyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) together with 100 parts by weight of the resins.

Manufacturing Example 5

Adhesive Composition D

Adhesive composition D was prepared by: putting together 4.3 parts by weight of ethylene glycol monovinyl ether, 5.7 parts by weight of maleic acid, 60 parts by weight of 4-hydroxybutyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) and 5 parts by weight of diphenyl(4-phenylthio)phenylsulfonium hexafluorophosphate (photoacid generator) together with 100 parts by weight of the resins.

Manufacturing Example 6

Adhesive Composition E

Adhesive composition E was prepared by: putting together 4.3 parts by weight of ethylene glycol monovinyl ether, 5.7 parts by weight of maleic acid, 60 parts by weight of 2-hydroxypropyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) together with 100 parts by weight of the resins.

Manufacturing Example 7

Adhesive Composition F

Adhesive composition F was prepared by: putting together 4.3 parts by weight of ethylene glycol monovinyl ether, 5.7 parts by weight of maleic acid, 60 parts by weight of 2-hydroxypropyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) and 5 parts by weight of diphenyl (4-phenylthio)phenylsulfonium hexafluorophosphate (photoacid generator) together with 100 parts by weight of the resins.

Manufacturing Example 8

Adhesive Composition G

Adhesive composition G was prepared by: putting together 4.3 parts by weight of ethylene glycol monovinyl ether, 5.7 parts by weight of fumaric acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) together with 100 parts by weight of the resins.

Manufacturing Example 9

Adhesive Composition H

Adhesive composition H was prepared by: putting together 4.3 parts by weight of ethylene glycol monovinyl ether, 5.7 parts by weight of fumaric acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) and 5 parts by weight of diphenyl (4-phenylthio)phenylsulfonium hexafluorophosphate (photoacid generator) together with 100 parts by weight of the resins.

Manufacturing Example 10

Adhesive Composition I

Adhesive composition I was prepared by: putting together 4.7 parts by weight of ethylene glycol monovinyl ether, 5.3 parts by weight of angelic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) together with 100 parts by weight of the resins.

Manufacturing Example 11

Adhesive Composition J

Adhesive composition J was prepared by: putting together 4.7 parts by weight of ethylene glycol monovinyl ether, 5.3 parts by weight of angelic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) and 5 parts by weight of diphenyl (4-phenylthio)phenylsulfonium hexafluorophosphate (photoacid generator) together with 100 parts by weight of the resins.

Manufacturing Example 12

Adhesive Composition K

Adhesive composition K was prepared by: putting together 4.6 parts by weight of tert-butyl vinyl ether, 5.4 parts by weight of maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) together with 100 parts by weight of the resins.

Manufacturing Example 13

Adhesive Composition L

Adhesive composition L was prepared by: putting together 4.6 parts by weight of tert-butyl vinyl ether, 5.4 parts by weight of maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) and 5 parts by weight of diphenyl (4-phenylthio)phenylsulfonium hexafluorophosphate (photoacid generator) together with 100 parts by weight of the resins.

Manufacturing Example 14

Adhesive Composition M

Adhesive composition M was prepared by: putting together 5 parts by weight of 1,4-butanol vinyl ether, 5 parts by weight of maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) together with 100 parts by weight of the resins.

Manufacturing Example 15

Adhesive Composition N

Adhesive composition N was prepared by: putting together 5 parts by weight of 1,4-butanol vinyl ether, 5 parts by weight of maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) and 5 parts by weight of diphenyl(4-phenylthio)phenylsulfonium hexafluorophosphate (photoacid generator) together with 100 parts by weight of the resins.

Manufacturing Example 16

Adhesive Composition O

Adhesive composition O was prepared by: putting together 4.3 parts by weight of ethylene glycol monovinyl ether, 5.7 parts by weight of maleic acid, 60 parts by weight of 2-hydroxyethyl acrylate, and 30 parts by weight of 6,6'-(((((propane-2,2-diylbis(4,1-phenylene))bis(oxy))bis(1-(acryloyloxy)propane-3,2-diyl))bis(oxy))bis(carbonyl))bis(cyclohex-3-enecarboxylic acid) (acidity: 142 KOH/g); mixing 3 parts by weight of phenylbis(2,4,6-trimethylbensoyl)-phosphine oxide (radical initiator) together with 100 parts by weight of the resins.

Manufacturing Example 17

Adhesive Composition P

Adhesive composition P was prepared by: putting together 4.3 parts by weight of ethylene glycol monovinyl ether, 5.7 parts by weight of maleic acid, 60 parts by weight of 2-hydroxyethyl acrylate, and 30 parts by weight of 6,6'-(((((propane-2,2-diylbis(4,1-phenylene))bis(oxy))bis(1-(acryloyloxy)propane-3,2-diyl))bis(oxy))bis(carbonyl))bis(cyclohex-3-enecarboxylic acid) (acidity: 142 KOH/g); and mixing 3 parts by weight of phenylbis(2,4,6-trimethylbensoyl)-phosphine oxide (radical initiator) and 5 parts by weight of diphenyl(4-phenylthio)phenylsulfonium hexafluorophosphate (photoacid generator) together with 100 parts by weight of the resins.

Manufacturing Example 18

Adhesive Composition Q

Adhesive composition Q was prepared by: putting together 4.3 parts by weight of ethylene glycol monovinyl ether, 5.7 parts by weight of maleic acid, 60 parts by weight of 2-hydroxyethyl acrylate, and 30 parts by weight of 4-((1-(5-(3-(2-((3-carboxypropanoyl)oxy)-3-(methacryloyloxy)propoxy)-4-(methylbenzyl)-2-methylphenoxy)-3-(methacryloyloxy)propane-2-yl)oxy)-4-oxobutanoic acid (acidity: 157 KOH/g); mixing 3 parts by weight of phenylbis(2,4,6-trimethylbensoyl)-phosphine oxide (radical initiator) together with 100 parts by weight of the resins.

Manufacturing Example 19

Adhesive Composition R

Adhesive composition R was prepared by: putting together 4.3 parts by weight of ethylene glycol monovinyl ether, 5.7 parts by weight of maleic acid, 60 parts by weight of 2-hydroxyethyl acrylate, and 30 parts by weight of 4-((1-(5-(3-(2-((3-carboxypropanoyl)oxy)-3-(methacryloyloxy)propoxy)-4-(methylbenzyl)-2-methylphenoxy)-3-(methacryloyloxy)propane-2-yl)oxy)-4-oxobutanoic acid (acidity: 157 KOH/g); and mixing 3 parts by weight of phenylbis(2,4,6-trimethylbensoyl)-phosphine oxide (radical initiator) and 5 parts by weight of diphenyl(4-phenylthio)phenylsulfonium hexafluorophosphate (photoacid generator) together with 100 parts by weight of the resins.

Manufacturing Example 20

Adhesive Composition S

Adhesive composition S was prepared by: putting together 60 parts by weight of 2-hydroxyethyl acrylate, and 40 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) together with 100 parts by weight of the resins.

Manufacturing Example 21

Adhesive Composition T

Adhesive composition T was prepared by: putting together 60 parts by weight of 2-hydroxyethyl acrylate, and 40 parts by weight of 4,4'-((((propane-2,2-diylbis(4,1-phenylene))bis(oxy))bis(1-methacryloyloxy)propane-3,2-diyl))bis(oxy))bis(4-oxobutanoic acid) (acidity: 157 KOH/g); and mixing 3 parts by weight of phenylbis(2,4,6-trimethylbensoyl)-phosphine oxide (radical initiator) and 5 parts by weight of diphenyl(4-phenylthio)phenylsulfonium hexafluorophosphate (photoacid generator) together with 100 parts by weight of the resins.

Example 1

Adhesive composition A prepared in Manufacturing Example 2 was applied to the acrylic protective film manufactured in Manufacturing Example 1 by using a pipette. Then, the acrylic protective film was attached to both surfaces of a polarizer, and the polarizer was passed through a laminator in such a condition that the final thickness of each adhesive layer would be within 1 μm to 2 μm. Thereafter, ultraviolet rays were emitted to sides to which the acrylic protective film was attached by using a UV radiation device (a D-bulb fusion lamp) at an intensity of 900 mJ/cm$^2$. In this way, a polarizing plate was manufactured. The polarizing plate was manufactured at a constant temperature of 20° C. and a constant humidity of 50%.

Example 2

A polarizing plate was manufactured in the same manner as in Example 1 except that adhesive composition B prepared in Manufacturing Example 3 was used instead of adhesive composition A.

Example 3

A polarizing plate was manufactured in the same manner as in Example 1 except that adhesive composition C prepared in Manufacturing Example 4 was used instead of adhesive composition A.

Example 4

A polarizing plate was manufactured in the same manner as in Example 1 except that adhesive composition D prepared in Manufacturing Example 5 was used instead of adhesive composition A.

Example 5

A polarizing plate was manufactured in the same manner as in Example 1 except that adhesive composition E prepared in Manufacturing Example 6 was used instead of adhesive composition A.

Example 6

A polarizing plate was manufactured in the same manner as in Example 1 except that adhesive composition F prepared in Manufacturing Example 7 was used instead of adhesive composition A.

Example 7

A polarizing plate was manufactured in the same manner as in Example 1 except that adhesive composition G prepared in Manufacturing Example 8 was used instead of adhesive composition A.

Example 8

A polarizing plate was manufactured in the same manner as in Example 1 except that adhesive composition H prepared in Manufacturing Example 9 was used instead of adhesive composition A.

Example 9

A polarizing plate was manufactured in the same manner as in Example 1 except that adhesive composition I prepared in Manufacturing Example 10 was used instead of adhesive composition A.

Example 10

A polarizing plate was manufactured in the same manner as in Example 1 except that adhesive composition J prepared in Manufacturing Example 11 was used instead of adhesive composition A.

Example 11

A polarizing plate was manufactured in the same manner as in Example 1 except that adhesive composition K prepared in Manufacturing Example 12 was used instead of adhesive composition A.

Example 12

A polarizing plate was manufactured in the same manner as in Example 1 except that adhesive composition L prepared in Manufacturing Example 13 was used instead of adhesive composition A.

Example 13

A polarizing plate was manufactured in the same manner as in Example 1 except that adhesive composition M prepared in Manufacturing Example 14 was used instead of adhesive composition A.

Example 14

A polarizing plate was manufactured in the same manner as in Example 1 except that adhesive composition N prepared in Manufacturing Example 15 was used instead of adhesive composition A.

Example 15

A polarizing plate was manufactured in the same manner as in Example 1 except that adhesive composition O prepared in Manufacturing Example 16 was used instead of adhesive composition A.

Example 16

A polarizing plate was manufactured in the same manner as in Example 1 except that adhesive composition P prepared in Manufacturing Example 17 was used instead of adhesive composition A.

Example 17

A polarizing plate was manufactured in the same manner as in Example 1 except that adhesive composition Q prepared in Manufacturing Example 18 was used instead of adhesive composition A.

Example 18

A polarizing plate was manufactured in the same manner as in Example 1 except that adhesive composition R prepared in Manufacturing Example 19 was used instead of adhesive composition A.

Comparative Example 1

A polarizing plate was manufactured in the same manner as in Example 1 except that adhesive composition S prepared in Manufacturing Example 20 was used instead of adhesive composition A.

Comparative Example 2

A polarizing plate was manufactured in the same manner as in Example 1 except that adhesive composition T prepared in Manufacturing Example 21 was used instead of adhesive composition A.

Experimental Example 1

Adhesiveness Test

The polarizing plates manufactured in Examples 1 to 18 and Comparative Examples 1 and 2 are maintained at a temperature of 20° C. at 70% relative humidity for four days, and then a stripping test was performed. The stripping test was performed on 20 mm wide×100 mm long pieces of the polarizing plate with a stripping speed of 300 mm/min and a stripping angle of 90 degrees so as to measure stripping forces. Measurement results are shown in Table 1 below, in which a stripping force of 3.0 N/cm or greater is denoted as exceptional, 2.0 N/cm to less than 3.0 N/cm as excellent, 1.0 N/cm to less than 2.0 N/cm as good, 0.5 N/cm to less than 1.0 N/cm as poor, and less than 0.5 N/cm as very poor.

TABLE 1

| NO. | Adhesive compositions | Adhesiveness |
|---|---|---|
| Example 1 | A | Exceptional |
| Example 2 | B | Excellent |
| Example 3 | C | Excellent |
| Example 4 | D | Excellent |
| Example 5 | E | Excellent |
| Example 6 | F | Excellent |
| Example 7 | G | Good |
| Example 8 | H | Good |
| Example 9 | I | Good |
| Example 10 | J | Good |
| Example 11 | K | Good |
| Example 12 | L | Good |
| Example 13 | M | Good |
| Example 14 | N | Good |
| Example 15 | O | Good |
| Example 16 | P | Good |
| Example 17 | Q | Excellent |
| Example 18 | R | Excellent |
| Comparative Example 1 | S | Very poor |
| Comparative Example 2 | T | Poor |

While exemplary embodiments have been shown and described above, it will be apparent to those skilled in the art that modifications and variations could be made without departing from the spirit and scope of the present disclosure as defined by the appended claims.

The invention claimed is:

1. A radically curable adhesive composition comprising:
a compound represented by Formula 1;
a vinyl ether-based compound;
a carboxylic acid compound having at least one unsaturated double bond;
a compound having an acidity of 100 to 1,000 mg KOH/g; and
a radical initiator,

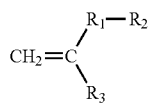

[Formula 1]

where $R_1$ is an ester group, $R_2$ is a $C_{1-10}$ alkyl group comprising at least one hydroxy substituent or a $C_{4-10}$ cycloalkyl group comprising at least one hydroxy substituent, and $R_3$ is hydrogen, wherein the compound having an acidity of 100 to 1,000 mg KOH/g comprises at least one selected from the group consisting of compounds represented by Formulas 10 to 21:

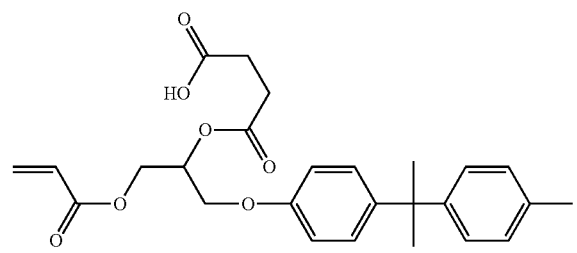

[Formula 10]

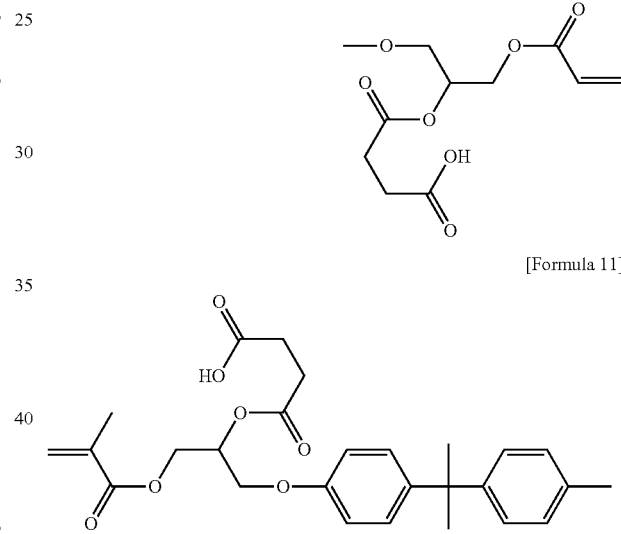

[Formula 11]

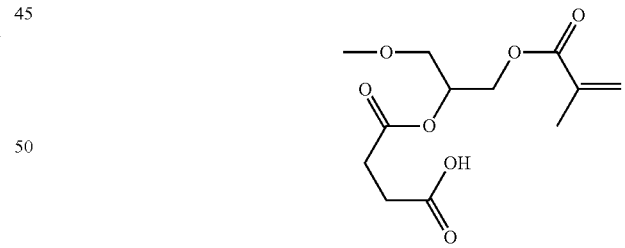

[Formula 12]

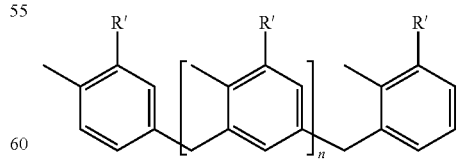

where R' is

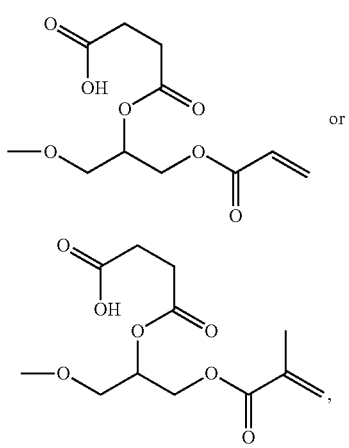

and n is an integer ranging from 1 to 5

[Formula 13]

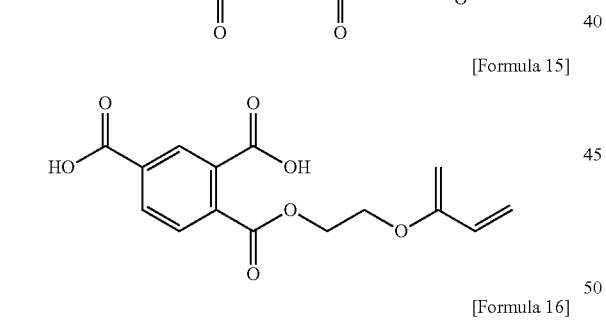

[Formula 14]

[Formula 15]

[Formula 16]

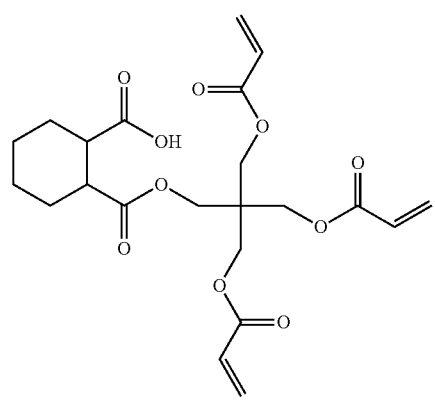

-continued

[Formula 17]

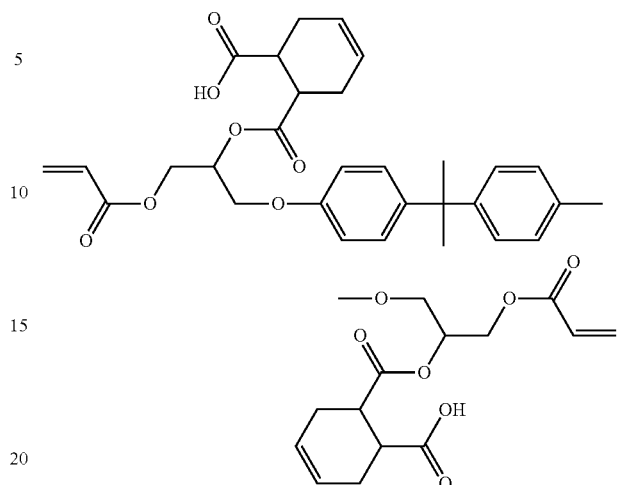

[Formula 18]

[Formula 19]

[Formula 20]

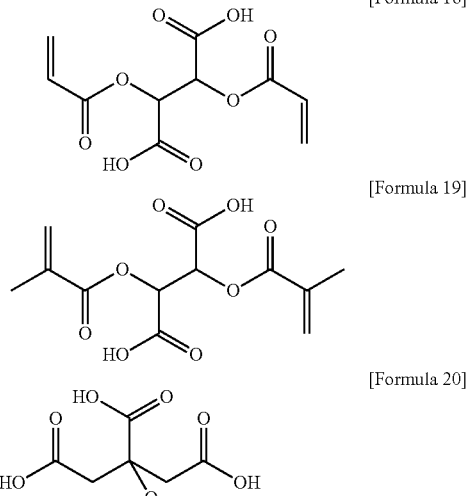

[Formula 21]

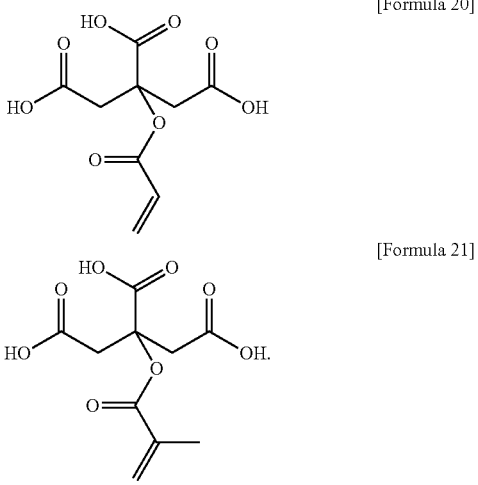

2. The radically curable adhesive composition of claim 1, wherein the radically curable adhesive composition comprises, based on 100 parts by weight thereof,
40 to 90 parts by weight of the compound represented by Formula 1;
1 to 50 parts by weight of the vinyl ether-based compound;
1 to 50 parts by weight of the carboxylic acid compound having at least one unsaturated double bond; and
0.5 to 10 parts by weight of the radical initiator.

3. The radically curable adhesive composition of claim 1, wherein the compound represented by Formula 1 comprises at least one selected from the group consisting of compounds represented by the following Formulas 2 to 9:

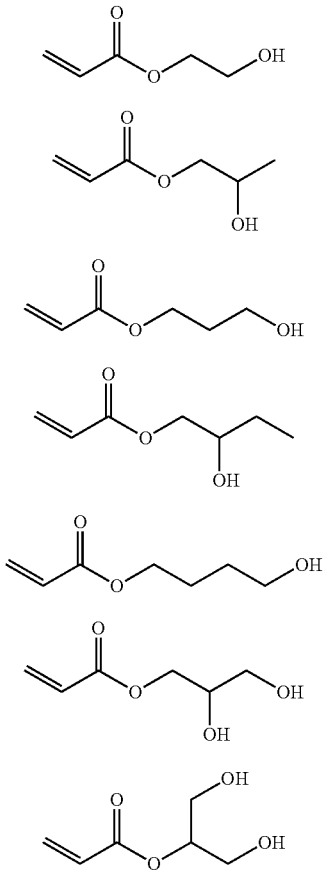

[Formula 2]
[Formula 3]
[Formula 4]
[Formula 5]
[Formula 6]
[Formula 7]
[Formula 8]

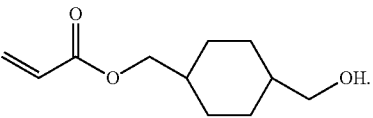

[Formula 9]

4. The radically curable adhesive composition of claim 1, wherein the vinyl ether-based compound comprises at least one selected from the group consisting of ethylene glycol monovinyl ether, 1,4-butanol vinyl ether, di(ethylene glycol) divinyl ether, tri(ethylene glycol) divinyl ether, tert-butyl vinyl ether, 1-(vinyloxy)-2,2-bis((vinyloxy)methyl)butane, 1,3-bis(vinyloxy)-2,2-bis((vinyloxy)methyl)propane, and cyclohexyl vinyl ether.

5. The radically curable adhesive composition of claim 1, wherein the carboxylic acid compound having at least one unsaturated double bond comprises at least one selected from the group consisting of maleic acid, fumaric acid, angelic acid, and tiglic acid.

6. The radically curable adhesive composition of claim 1, wherein the compound having an acidity of 100 to 1,000 mg KOH/g is included in an amount of 10 to 50 parts by weight, based on 100 parts by weight of the radically curable adhesive composition.

7. The radically curable adhesive composition of claim 1, further comprising a photoacid generator.

8. The radically curable adhesive composition of claim 1, wherein the radically curable adhesive composition has a glass transition temperature of 60° C. to 500° C.

9. A polarizing plate comprising:
a polarizer;
an adhesive layer formed on at least one surface of the polarizer; and
a protective film formed on the adhesive layer,
wherein the adhesive layer is formed of the radically curable adhesive composition of claim 1.

* * * * *